United States Patent
Mitchell et al.

(10) Patent No.: US 9,840,424 B2
(45) Date of Patent: Dec. 12, 2017

(54) WATER FILTER ASSEMBLY FOR A BEVERAGE DISPENSER

(71) Applicant: General Electric Company, Schenectady, NY (US)

(72) Inventors: Alan Joseph Mitchell, Louisville, KY (US); Ansuraj Seenivasan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 208 days.

(21) Appl. No.: 14/795,202

(22) Filed: Jul. 9, 2015

(65) Prior Publication Data
US 2017/0008774 A1 Jan. 12, 2017

(51) Int. Cl.
| | |
|---|---|
| *A47J 31/057* | (2006.01) |
| *A47J 31/06* | (2006.01) |
| *C02F 1/00* | (2006.01) |
| *A47J 31/60* | (2006.01) |
| *C02F 1/28* | (2006.01) |

(52) U.S. Cl.
CPC .............. *C02F 1/003* (2013.01); *A47J 31/605* (2013.01); *C02F 1/283* (2013.01); *C02F 2307/10* (2013.01)

(58) Field of Classification Search
CPC ...................... A47J 31/04; A47J 31/057; A47J 31/06–31/0689; A47J 31/08–31/085; A47J 31/10
USPC ............................ 99/279, 295–306, 316–323
See application file for complete search history.

(56) References Cited

U.S. PATENT DOCUMENTS

| | | | |
|---|---|---|---|
| 4,749,481 A | 6/1988 | Wheatley | |
| 5,634,394 A * | 6/1997 | Cortese | A47J 31/0684 99/287 |
| 5,800,707 A * | 9/1998 | Mehnert | C02F 1/003 210/232 |
| 7,703,382 B2 * | 4/2010 | Oranski | B67D 1/001 210/198.1 |
| 8,950,315 B2 * | 2/2015 | Lai | A47J 31/42 99/279 |
| 9,045,353 B2 * | 6/2015 | Parekh | |
| 2003/0159979 A1 | 8/2003 | Chau | |
| 2007/0175335 A1 * | 8/2007 | Liverani | B65D 85/8043 99/279 |
| 2011/0008774 A1 * | 1/2011 | Delisa | C12N 15/1041 435/5 |
| 2015/0107461 A1 * | 4/2015 | Webster | A47J 31/0647 99/295 |
| 2016/0045061 A1 * | 2/2016 | Balestier | A47J 31/4403 99/285 |

(Continued)

*Primary Examiner* — Michael Laflame, Jr.
(74) *Attorney, Agent, or Firm* — Dority & Manning, P.A.

(57) ABSTRACT

A water filter assembly for a beverage dispenser including a filter medium and a housing is provided. The water filter assembly may be positioned in a reservoir of the beverage dispenser. The filter medium and housing of the water filter assembly each extend in a direction generally perpendicular to a vertical direction of the beverage dispenser. The housing includes a support member at a first end and an attachment member at a second end. The support member is configured for supporting the water filter assembly within the reservoir, and the attachment member is configured for attaching the housing of the water filter assembly to a fitting in the reservoir of the beverage dispenser.

20 Claims, 6 Drawing Sheets

(56) References Cited

U.S. PATENT DOCUMENTS

2016/0095463 A1\* 4/2016 Mazzer ................. A47J 31/08
100/266

\* cited by examiner

WATER FILTER ASSEMBLY FOR A BEVERAGE DISPENSER

FIELD OF THE INVENTION

The present subject matter relates generally to a water filter assembly for a beverage dispenser.

BACKGROUND OF THE INVENTION

Single serve beverage dispensers (SSBDs) are increasingly popular and have become ubiquitous on kitchen countertops. Certain SSBDs are loaded with capsules or pods that allow users to brew or mix an individual-size, unique, hot or cold beverage. Thus, SSBDs may provide a single cup of coffee to users who do not consume or desire an entire pot of coffee. In order to provide single beverages, SSBDs generally dispense small volumes of liquid (e.g., between eight and sixteen ounces) for each beverage. To permit consecutive preparation of beverages and decrease preparation time, certain SSBDs include a removable water storage reservoir. The reservoir is generally sized to between four and eight dispenses worth of water therein.

A filter may be provided within the reservoir over an outlet of the reservoir to filter contaminants from the water within the reservoir. In order to minimize a pressure drop over the filter (which may cause difficulties for certain SSBDs), the filters are generally configured as a single mesh filter. However, such a filter may be ineffective at filtering particles from the water within the reservoir smaller than a certain threshold. Additionally, such a filter may be ineffective at filtering volatile organic compounds—such as chloroform, lindane, and atrazine—from the water within the reservoir.

Accordingly, a water filter assembly for a beverage dispenser capable of more effectively removing particles and/or volatile organic compounds from the water within the reservoir would be beneficial. Moreover, a water filter assembly for a beverage dispenser capable of more effectively removing particles and/or volatile organic compounds from water within a reservoir while minimizing a pressure drop over such filter would be particularly useful.

BRIEF DESCRIPTION OF THE INVENTION

Aspects and advantages of the invention will be set forth in part in the following description, or may be apparent from the description, or may be learned through practice of the invention.

In a first exemplary embodiment, a water filter assembly for a beverage dispenser defining a vertical direction is provided. The water filter assembly includes a filter medium extending in a direction generally perpendicular to the vertical direction and a housing. The housing encloses the filter medium and also extends in a direction generally perpendicular to the vertical direction between a first end and a second end. The housing includes a support member at the first end extending along the vertical direction for supporting the water filter assembly, and an attachment member at the second end for attaching the housing to a fitting in a reservoir of the beverage dispenser.

In a second exemplary embodiment, a beverage dispenser defining a vertical direction is provided. The beverage dispenser includes a dispenser and a reservoir defining an outlet fluidly connected to the dispenser. The reservoir includes a fitting positioned at least partially around the outlet. The beverage dispenser also includes a water filter assembly positioned in the reservoir. The beverage dispenser includes a filter medium extending in a direction generally perpendicular to the vertical direction, and a housing. The housing encloses the filter medium and also extends in a direction generally perpendicular to the vertical direction between a first end and a second end. The housing includes a support member at the first end extending along the vertical direction for supporting the water filter assembly and an attachment member at the second end for attaching and fluidly connecting the housing to the fitting in the reservoir of the beverage dispenser.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
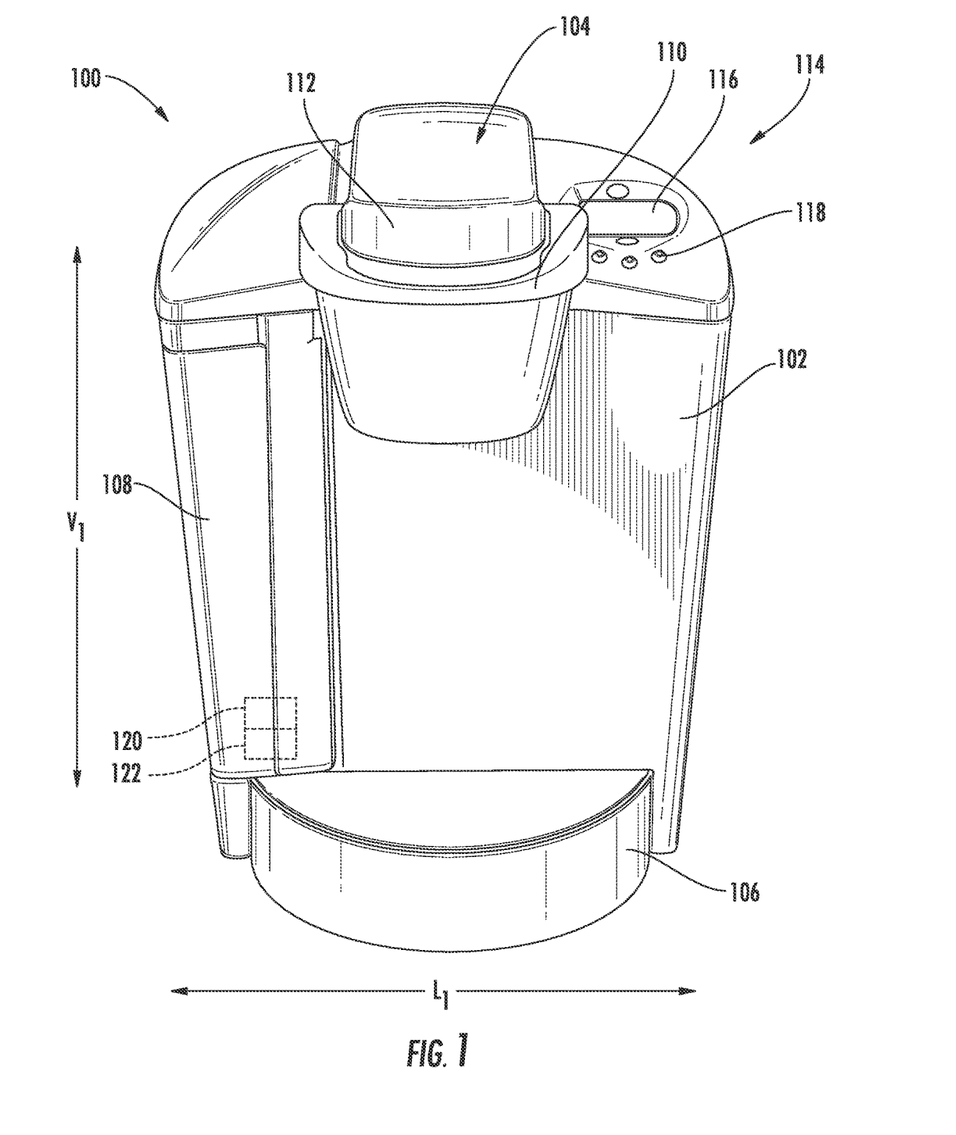
FIG. 1 provides a front, perspective view of a beverage dispenser according to an exemplary embodiment of the present subject matter.

FIG. 1 provides a front, perspective view of a beverage dispenser 100 according to an exemplary embodiment of the present subject matter. Beverage dispenser 100 is generally referred to as a "single serve beverage dispenser 100" and receives capsules or pods with flavorings therein that are brewed or mixed with hot or cold water to provide a hot or cold beverage, as desired. As an example, beverage dispenser 100 may be a KEURIG® brand single-cup coffee brewing system or a VERISMO™ brand single-cup coffee brewing system. However, beverage dispenser 100 may alternatively be any other suitable beverage dispenser 100.

As may be seen in FIG. 1, the exemplary beverage dispenser 100 generally defines a vertical direction $V_1$, a lateral direction $L_1$, and a transverse direction $T_1$, each orthogonal to one another. Additionally, the beverage dispenser 100 includes a body 102, a dispenser portion 104, a pan or tray 106, and a reservoir 108. A lever 110 is provided with dispenser portion 104 to allow a user to open a lid 112 of dispenser portion 104 and access a receptacle (not shown) for receiving a capsule or pod. During brewing or mixing operations, water may be taken from the reservoir 108, heated or cooled, and provided to dispenser portion 104, wherein dispenser portion 104 either brews or mixes the water with the contents of the capsule or pod to provide a desired beverage. For example, although not depicted, the exemplary beverage dispenser 100 may further include a pump and a hot water chamber positioned within the body 102. The hot water chamber may be fluidly connected between an outlet 170 of the reservoir 108 (see FIGS. 4 and 5) and the dispenser portion 104 for providing heated water to the dispenser portion 104. More particularly, during operation of the beverage dispenser 100, the pump may provide water from the outlet 170 of the reservoir 108 to the hot water chamber. Water in the hot water chamber may be heated and subsequently provided to the dispenser portion 104 as needed.

The beverage may be dispensed into a cup or mug (not shown) placed on tray 106 by a user. The exemplary beverage dispenser 100 also includes a control panel 114 including a display 116 and a plurality of user inputs 118 allowing the user to control operation of beverage dispenser 100.

As will be explained in greater detail below, and as is depicted in phantom in FIG. 1, a water filter assembly 120 is positioned in the reservoir 108 and attached to a fitting 122 of the reservoir 108. The fitting 122 may be formed integrally with the reservoir 108, or alternatively may be removably attached to the reservoir 108. The water filter assembly 120 is generally provided to remove contaminants and particles from the water in reservoir 108 through, e.g., mechanical filtration and/or absorption of such contaminants.

Notably, during operation of the beverage dispenser 100, if a pressure drop across water filter assembly 120 is greater than a certain threshold, fluid may be pulled from a priming vent of the pump as opposed to reservoir 108. In such a case, air pulled from the priming vent may cause the pump to cavitate and not operate properly. Accordingly, as is discussed below, the water filter assembly 120 of the present disclosure is configured to more efficiently filter water in the reservoir 108, while maintaining a relatively low pressure drop across the water filter assembly 120.

It should be appreciated, however, that the present disclosure is not limited to any specific beverage dispenser 100, and in other exemplary embodiments, beverage dispenser 100 may have any other suitable configuration.

Figure 2:
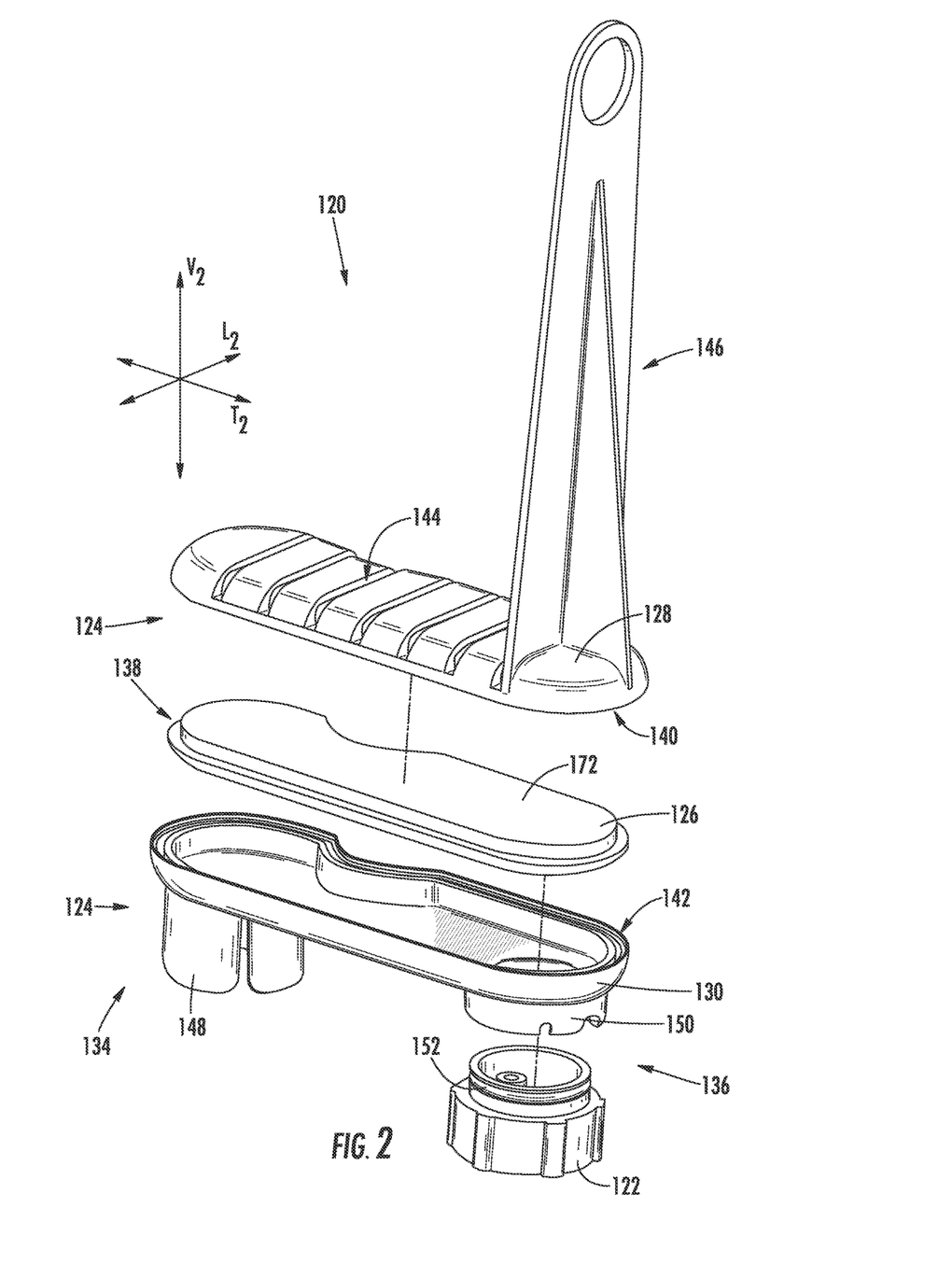
FIG. 2 provides an exploded perspective view of a water filter assembly in accordance with an exemplary embodiment of the present disclosure.
Figure 3:
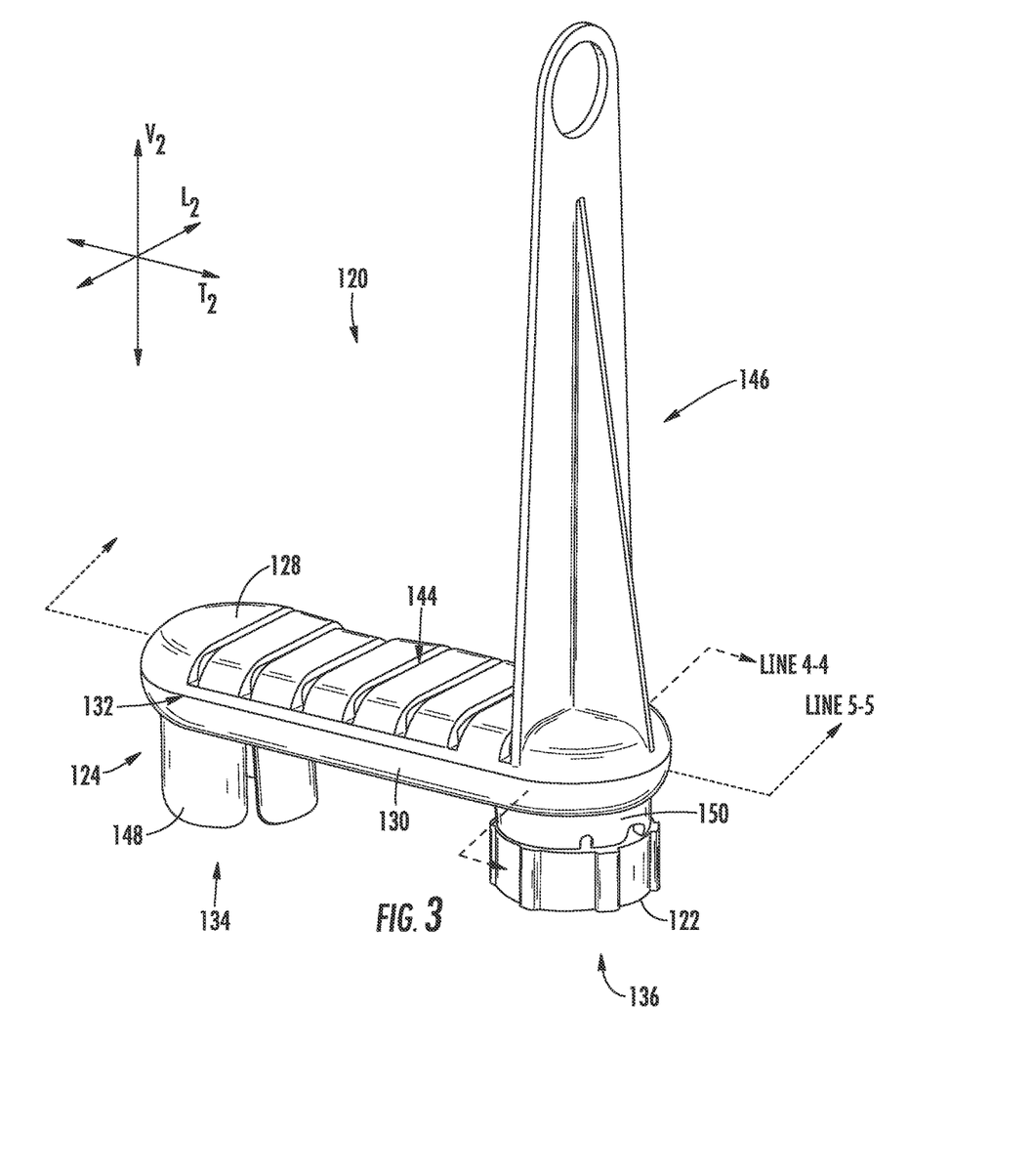
FIG. 3 provides an assembled perspective view of the exemplary water filter assembly of FIG. 2.

Referring now to FIGS. 2 and 3, a water filter assembly 120 in accordance with an exemplary embodiment of the present disclosure is provided. More particularly, FIG. 2 provides an exploded perspective view of the exemplary water filter assembly 120, and FIG. 3 provides an assembled perspective view of the exemplary water filter assembly 120. Notably, for the embodiment of FIGS. 2 and 3, the water filter assembly 120 is depicted with a housing 124 attached to a fitting of a reservoir, such as the fitting 122 of the reservoir 108 of the exemplary beverage dispenser 100 of FIG. 1.

As is depicted, the water filter assembly 120 generally defines a vertical direction $V_2$, a lateral direction $L_2$, and a transverse direction $T_2$, each orthogonal to one another. Once installed, the vertical direction $V_2$ of the water filter assembly 120 may be parallel to the vertical direction V1 of the beverage dispenser 100 depicted in FIG. 1. Similarly, the lateral and transverse directions $L_2$, $T_2$ of the water filter assembly 120 may also be parallel to the lateral and transverse directions L1, T1, respectively, of the beverage dispenser 100 depicted in FIG. 1.

The water filter assembly 120 includes a housing 124 and a filter medium 126 (FIG. 2). For the embodiment depicted, the housing 124 is formed generally of a top member 128 and a bottom member 130, the top member 128 positioned above the bottom member 130 along the vertical direction $V_2$. Additionally, as may be seen in FIG. 3, when assembled, the top and bottom members 128, 130 are attached to one another and together define an attachment line 132 extending around a circumference of the water filter assembly 120. Moreover, the housing 124 generally extends in a direction perpendicular to the vertical direction $V_2$, which for the embodiment depicted is the transverse direction $T_2$, between a first end 134 and a second end 136. Similarly, the filter medium 126 also extends within the housing 124 in a direction generally perpendicular to the vertical direction $V_2$, which for the embodiment depicted is also the transverse direction $T_2$. As will be discussed in greater detail below, the filter medium 126 is attached within the housing 124 by having an outer portion 138 of the filter medium 126 sandwiched between a perimeter 140 of the top member 128 of the housing 124 and a perimeter 142 of the bottom member 130 of the housing 124. The housing 124, or more particularly, the top member 128 of the housing 124, defines one or more openings 144 such that water from the reservoir 108 may flow into the housing 124, through the filter medium 126 and be provided to, e.g., the dispenser portion 104 of the beverage dispenser 100.

Notably, the water filter assembly 120 also includes a handle 146 extending along the vertical direction $V_2$. The handle 146 is positioned at the second end 136 and may assist a user in removing the water filter assembly 120 and/or installing the water filter assembly 120.

Figure 4:
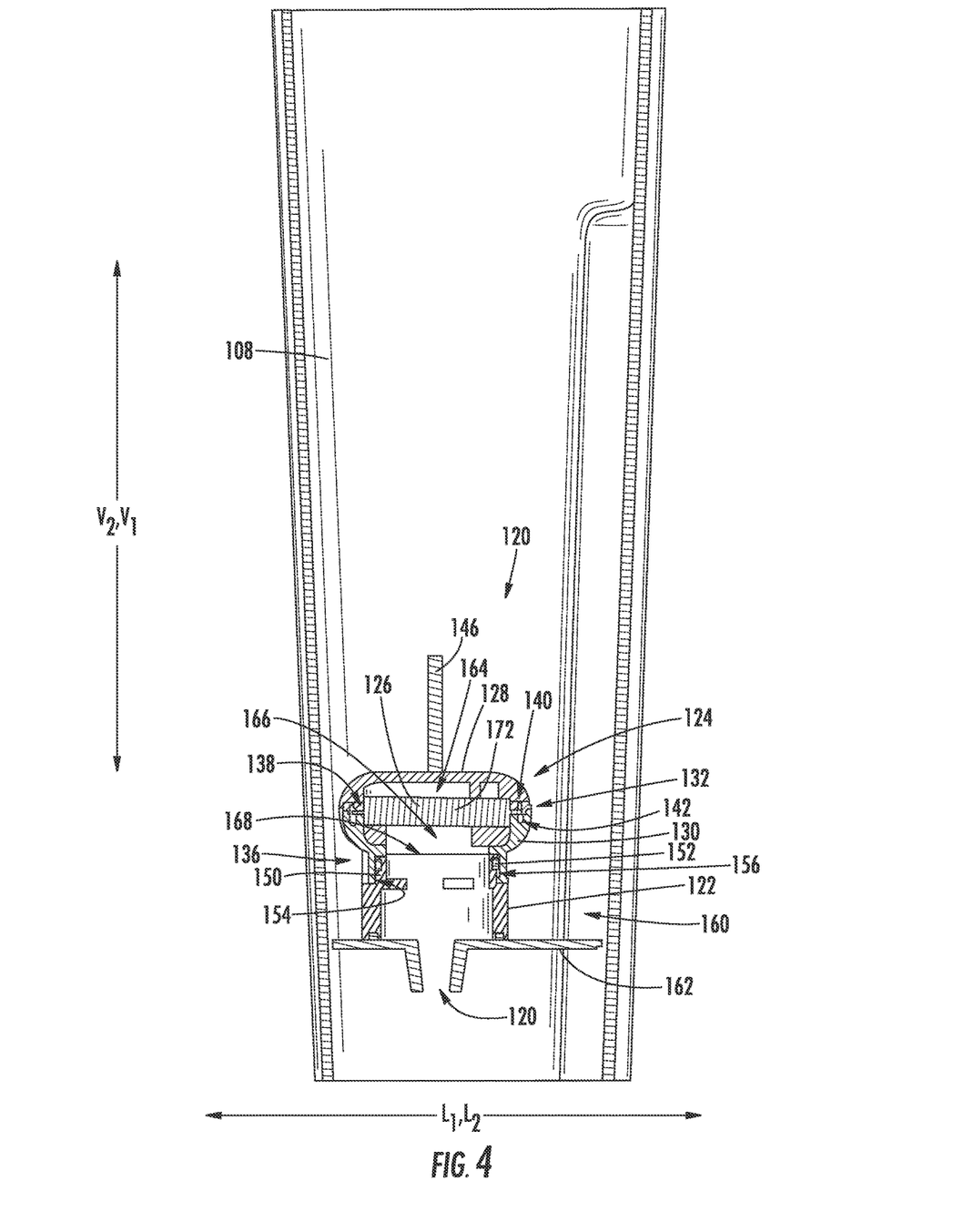
FIG. 4 provides a side, cross-sectional view of the exemplary water filter assembly of FIG. 2 taken along Line 4-4 in FIG. 3, positioned in a reservoir of an exemplary beverage dispenser.
Figure 5:
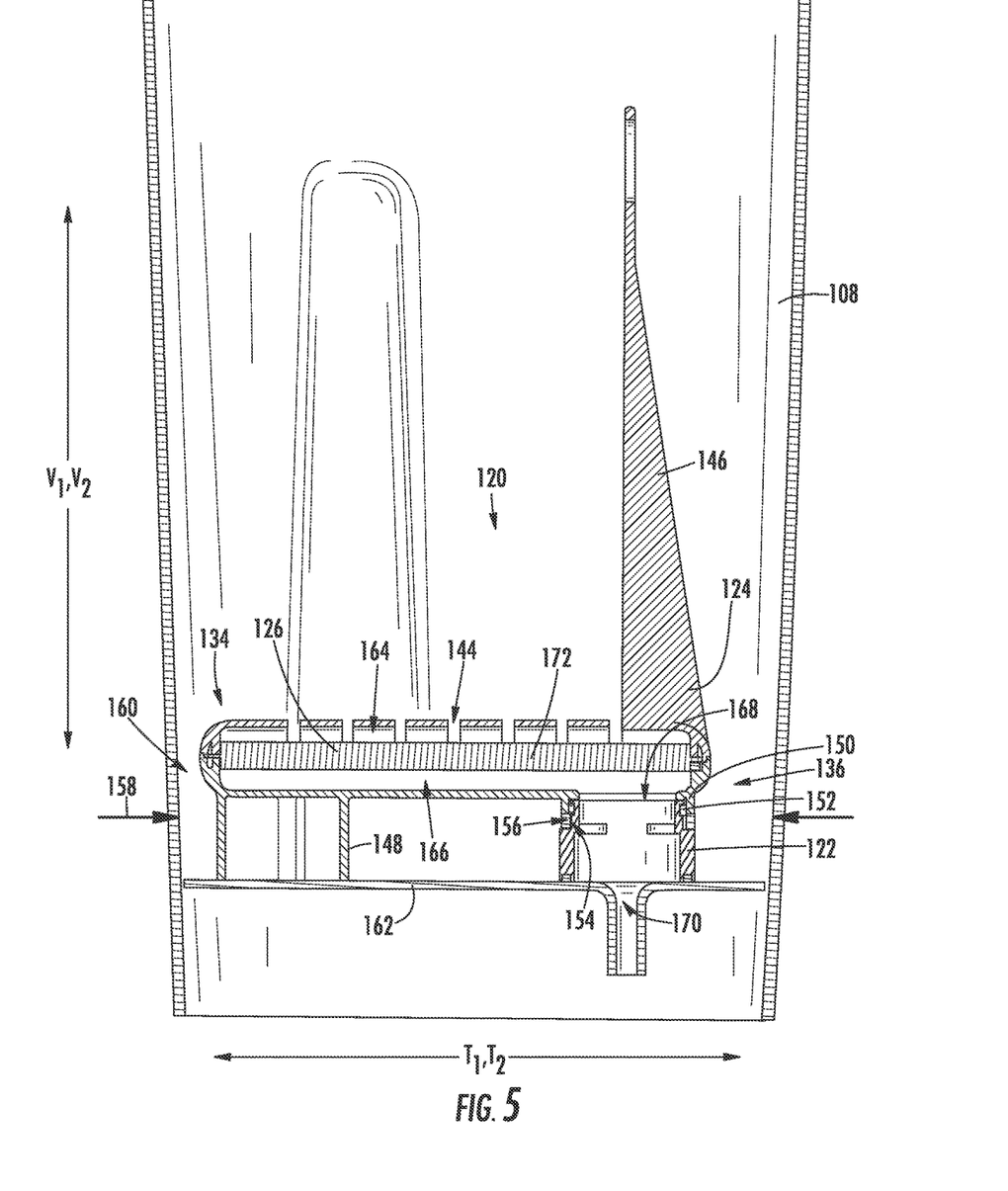
FIG. 5 provides a side, cross-sectional view of the exemplary water filter assembly of FIG. 2 taken along Line 5-5 in FIG. 3, positioned in a reservoir of an exemplary beverage dispenser.

Referring now to FIGS. 4 and 5, cross-sectional views are provided of the exemplary water filter assembly 120 of FIGS. 2 and 3 positioned in the reservoir 108 of the exemplary beverage dispenser 100 of FIG. 1. More particularly, FIG. 4 provides a cross-sectional view of the exemplary water filter assembly 120 taken along Line 4-4 in FIG. 3, and FIG. 5 provides a cross-sectional view of the exemplary water filter assembly 120 taken along Line 5-5 in FIG. 3.

The housing 124, or more particularly the bottom member 130 of the housing 124, includes a support member 148 at the first end 134 extending along the vertical direction $V_2$ for supporting the water filter assembly 120 and an attachment member 150 at the second end 136 for attaching and fluidly connecting the housing 124 to the fitting 122 of the reservoir 108 of the beverage dispenser 100. The attachment member 150 defines a generally cylindrical shape configured to fit over at least a portion of the fitting 122 of the reservoir 108 and form a fluid seal with the fitting 122 of the reservoir 108 (see also FIGS. 2 and 3). Moreover, the fitting 122 includes a seal member 152 extending around an outside surface 156 of the fitting 122 of the reservoir 108 forming a fluid seal with an inside surface 154 of the attachment member 150. For the embodiment depicted, the seal member 152 is an O-ring seal positioned in a groove defined in the outside surface 156 of the fitting 122. However in other embodiments, any other suitable seal member 152 may be provided. Notably, for the embodiment depicted, the handle 146 is positioned generally above the attachment member 150, such that handle 146 may be used to more easily remove and/or install the water filter assembly 120.

Moreover, the housing 124 and filter medium 126 of the exemplary water filter assembly 120 extend in the transverse direction $T_2$ substantially along a width 158 of the reservoir 108 at a bottom portion 160 of the reservoir 108. For example, the housing 124 and filter medium 126 extend at least about fifty percent (50%) across a width 158 of the reservoir 108 at the bottom portion 160 of the reservoir 108. However, in other embodiments, the housing 124 and filter medium 126 may each extend at least about sixty percent (60%) across a width 158 of the reservoir 108 at the bottom portion 160 of the reservoir 108, at least about seventy percent (70%) across a width 158 of the reservoir 108 at the bottom portion 160 of the reservoir 108, at least about eighty percent (80%) across a width 158 of the reservoir 108 at the bottom portion 160 of the reservoir 108, or at least about ninety percent (90%) across a width 158 of the reservoir 108 at the bottom portion 160 of the reservoir 108.

Such a configuration may allow for a low-profile water filter assembly 120 capable of utilizing substantially all of a surface area of the filter medium 126 despite a low water level in the reservoir 108 within which it is installed.

Notably, given the elongated configuration of the water filter assembly 120, the support member 148 may assist in maintaining the water filter correctly installed on the fitting 122 of the reservoir 108. For example, the support member 148 included at the first end 134 of the housing 124, extending along the vertical direction $V_2$, contacts a bottom wall 162 of the reservoir 108 and provides support to the water filter assembly 120. More particularly, the support member 148 may support a weight of the water filter assembly 120 and transfer to the reservoir 108 any forces on the first end 134 of the housing 124 of the water filter assembly 120 due to, e.g., filtering activities. Such a configuration may ensure a proper seal is maintained between the attachment member 150 of the housing 124 and the fitting 122 of the reservoir 108.

Referring still to FIGS. 4 and 5, the housing 124 defines a top chamber 164 positioned above the filter medium 126 along the vertical direction $V_2$ and a bottom chamber 166 positioned below the filter medium 126 along the vertical direction $V_2$. The top chamber 164 is generally defined by the top member 128 of the housing 124 and the filter medium 126 and the bottom chamber 166 is generally defined by the bottom member 130 of the housing 124 and filter medium 126. The top member 128 defines the one or more openings 144 to the top chamber 164 and the bottom member 130 defines an outlet 168 from the bottom chamber 166. The one or more openings 144 in the top member 128 allow for a flow of water from the reservoir 108 into the top chamber 164. Additionally, the outlet 168 defined by the bottom member 130 is in fluid communication with an outlet 170 of the reservoir 108 through the fitting 122 and allows for a flow of water from the bottom chamber 166 to the outlet 170 of the reservoir 108.

During operation of the beverage dispenser 100 and water filter assembly 120, water from the reservoir 108 may flow through the one or more openings 144 in the top member 128 of the housing 124 and to the top chamber 164. The filter medium 126 is positioned within the housing 124 such that water flows through the filter medium 126 generally along the vertical direction $V_2$ substantially across an entire surface area of the filter medium 126. Such a flow may be assisted by the gravitational forces on the water. The filtered water may then be collected in the bottom chamber 166 and directed through the outlet 168 defined by the attachment member 150 into and through the outlet 170 of the reservoir 108. A water filter assembly 120 having such a configuration may allow for an increased surface area of filter medium 126 to be used in filtering water in the reservoir 108, while minimizing a pressure drop across the filter medium 126 and water filter assembly 120. Additionally, due to the relatively flat configuration of the water filter assembly 120 and location of the water filter assembly 120 at the bottom portion of the reservoir 108, the water filter assembly 120 may provide filtered water to the outlet 170 of the reservoir 108 despite a relatively low water level in the reservoir 108.

Figure 6:
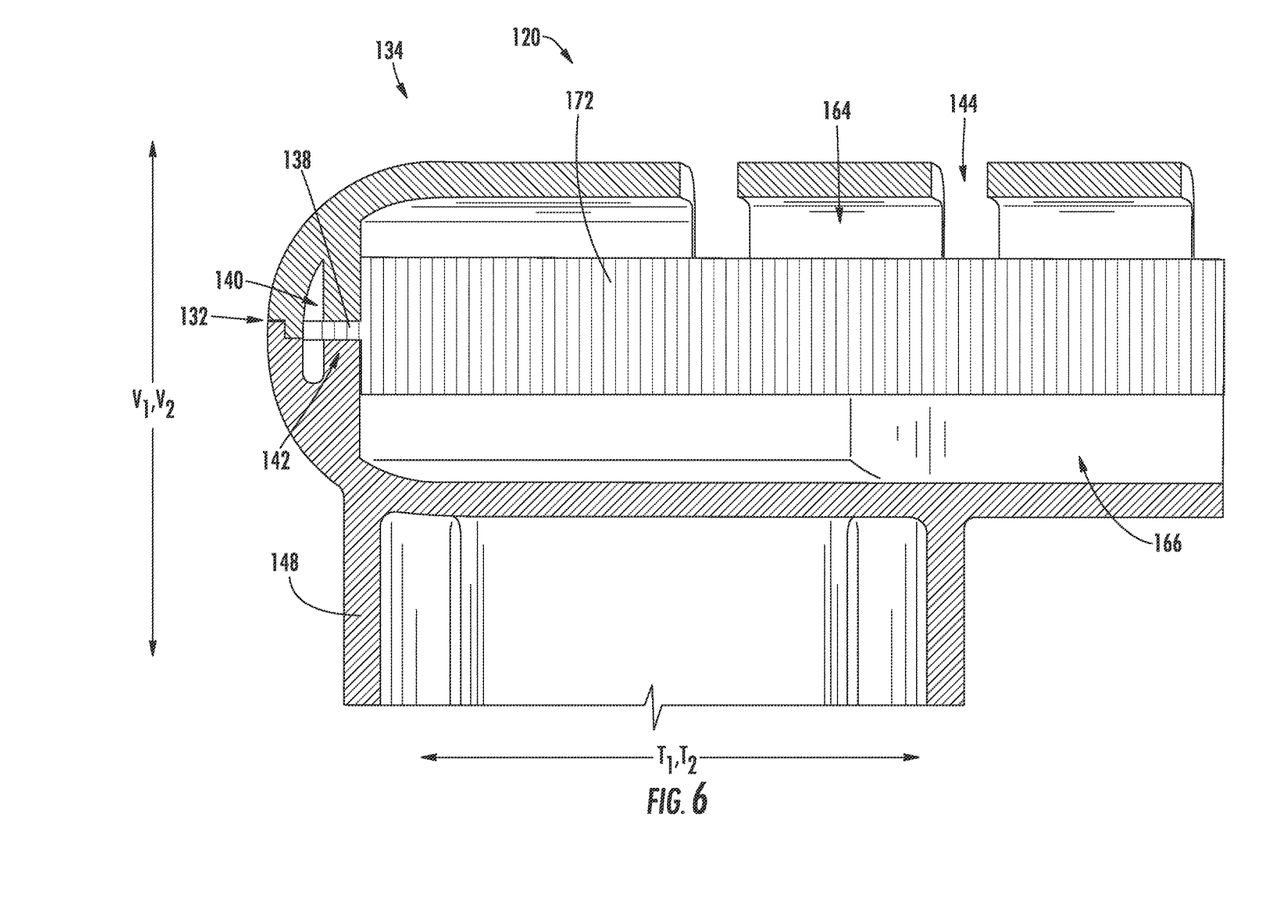
FIG. 6 provides a close-up cross-sectional view of a first end of the exemplary water filter assembly of FIG. 2.

Referring still to the FIGS., the exemplary filter medium 126 generally includes a body 172 and the outer portion 138. The body 172 and/or outer portion 138 of the filter medium 126 may include one or more of a carbon foam filter medium or a carbon impregnated paper filter medium. Alternatively, however, in other embodiments, filter medium 126 may instead include any other suitable filter medium for filtering water in the reservoir 108. For example, in other exemplary embodiments, the filter medium 126 may include a fine mesh material. Additionally, referring now briefly to FIG. 6, providing a close-up view of the first end 134 of the housing 124, the filter medium 126 is attached within the housing 124 by having the outer portion 138 pressed between the perimeter 140 of the top member 128 and perimeter 142 of the bottom member 130. With such a configuration, the top chamber 164 is sealed off from the bottom chamber 166, such that any water in the top chamber 164 must flow through the filter medium 126 to reach the bottom chamber 166. In certain embodiments, the top member 128 of the housing 124 may be attached to the bottom member 130 of the housing 124 using, e.g., an ultrasonic welding process and/or one or more mechanical snaps (not shown).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A water filter assembly for a beverage dispenser defining a vertical direction, the water filter assembly comprising:
a filter medium extending in a direction generally perpendicular to the vertical direction; and
a housing enclosing the filter medium and also extending in a direction generally perpendicular to the vertical direction between a first end and a second end, the housing defining a bottom chamber and including a support member at the first end extending away from the bottom chamber along the vertical direction for supporting the water filter assembly, and an attachment member at the second end for attaching the housing to a fitting in a reservoir of the beverage dispenser.

2. The water filter assembly of claim 1, wherein the housing defines a top chamber positioned above the filter medium along the vertical direction, one or more openings to the top chamber, and an outlet from the bottom chamber, and wherein the bottom chamber is positioned below the filter medium along the vertical direction.

3. The water filter assembly of claim 2, wherein the filter medium is positioned within the housing such that water flows through the filter medium generally along the vertical direction.

4. The water filter assembly of claim 1, wherein the filter medium is comprised of one or more of a carbon foam or a carbon impregnated paper.

5. The water filter assembly of claim 1, wherein the housing includes a handle extending along the vertical direction at the second end to assist a user in removing the water filter assembly, and wherein the handle is positioned generally above the attachment member.

6. The water filter assembly of claim 1, wherein the attachment member defines a generally cylindrical shape configured to fit over at least a portion of the fitting of the reservoir and form a fluid seal with the fitting of the reservoir.

7. The water filter assembly of claim 1, wherein the fitting includes a seal member extending around an outside surface of the fitting of the reservoir for forming a fluid seal with an inside surface of the attachment member.

8. The water filter assembly of claim 1, wherein the housing includes a top member attached to a bottom member, and wherein the top and bottom members together define an attachment line extending around a circumference of the water filter assembly.

9. The water filter assembly of claim 8, wherein the filter medium includes an outer portion, and wherein the filter medium is attached within the housing by having the outer portion pressed between the top member and bottom member.

10. The water filter assembly of claim 1, wherein the support member is spaced from the attachment member along a direction generally perpendicular to the vertical direction.

11. A beverage dispenser defining a vertical direction, the beverage dispenser comprising:
a dispenser;
a reservoir defining an outlet fluidly connected to the dispenser, the reservoir including a fitting positioned at least partially around the outlet; and
a water filter assembly positioned in the reservoir and including
a filter medium extending in a direction generally perpendicular to the vertical direction; and
a housing enclosing the filter medium and also extending in a direction generally perpendicular to the vertical direction between a first end and a second end, the housing defining a bottom chamber and including a support member at the first end extending away from the bottom chamber along the vertical direction for supporting the water filter assembly and an attachment member at the second end for attaching and fluidly connecting the housing to the fitting in the reservoir of the beverage dispenser.

12. The beverage dispenser of claim 11, further comprising
a hot water chamber fluidly connected between the outlet of the reservoir and the dispenser for providing heated water to the dispenser.

13. The beverage dispenser of claim 11, wherein the housing defines a top chamber positioned above the filter medium along the vertical direction, one or more openings to the top chamber, and an outlet from the bottom chamber, and wherein the bottom chamber is positioned below the filter medium along the vertical direction.

14. The beverage dispenser of claim 13, wherein the filter medium is positioned within the housing such that water flows through the filter medium generally along the vertical direction.

15. The beverage dispenser of claim 11, wherein the filter medium is comprised of one or more of a carbon foam or a carbon impregnated paper.

16. The beverage dispenser of claim 11, wherein the housing includes a handle extending along the vertical direction at the second end to assist a user in removing the water filter assembly, and wherein the handle is positioned generally above the attachment member.

17. The beverage dispenser of claim 11, wherein the attachment member defines a generally cylindrical shape configured to fit over at least a portion of the fitting of the reservoir and form a fluid seal with the fitting of the reservoir.

18. The water filter assembly of claim 1, wherein the housing includes a top member attached to a bottom member, and wherein the top and bottom members together define an attachment line extending around a circumference of the water filter assembly.

19. The beverage dispenser of claim 18, wherein the filter medium includes an outer portion, and wherein the filter medium is attached within the housing by having the outer portion pressed between the top member and bottom member.

20. The water filter assembly of claim 11, wherein the housing and filter medium extend at least about 50% across a width of the reservoir at a bottom portion of the reservoir.

* * * * *